United States Patent
Basye et al.

(10) Patent No.: US 9,548,053 B1
(45) Date of Patent: Jan. 17, 2017

(54) AUDIBLE COMMAND FILTERING

(71) Applicant: Amazon Technologies, Inc., Seattle, WA (US)

(72) Inventors: Kenneth John Basye, Sutton, MA (US); William Tunstall-Pedoe, Cambridge (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 27 days.

(21) Appl. No.: 14/491,436

(22) Filed: Sep. 19, 2014

(51) Int. Cl.
| | |
|---|---|
| *G10L 21/00* | (2013.01) |
| *G10L 15/22* | (2006.01) |
| *G10L 21/06* | (2013.01) |
| *G10L 25/48* | (2013.01) |
| *G10L 15/08* | (2006.01) |
| *G06F 17/30* | (2006.01) |

(52) U.S. Cl.
CPC ......... *G10L 15/22* (2013.01); *G06F 17/30743* (2013.01); *G10L 15/083* (2013.01); *G10L 21/06* (2013.01); *G10L 25/48* (2013.01); *G10L 2015/088* (2013.01); *G10L 2015/223* (2013.01)

(58) Field of Classification Search
CPC .. G06F 3/04842; G06F 3/04847; G06F 3/005; G06F 3/011; G06F 17/30743; G06F 17/30244; G06F 17/30749; G06F 17/30758; G06F 17/30873; G10L 15/22; G10L 15/26; G10L 17/005; G10L 2021/105
USPC ............ 704/231, 246, 258, 270, 275, 270.1; 715/727, 810; 725/18, 22
See application file for complete search history.

(56) References Cited

U.S. PATENT DOCUMENTS

| | | | | |
|---|---|---|---|---|
| 4,305,131 A * | 12/1981 | Best | .................... | G11B 27/105 704/246 |
| 8,121,618 B2* | 2/2012 | Rhoads | .................. | G01C 21/20 455/456.1 |
| 8,643,674 B2* | 2/2014 | Van Hoff | .............. | G06T 15/005 345/419 |
| 8,661,495 B2* | 2/2014 | Reisman | ........... | G06F 17/30873 725/110 |
| 8,892,276 B1* | 11/2014 | Young | .................... | A63H 19/24 701/19 |
| 2006/0085199 A1* | 4/2006 | Jain | .......................... | G10L 15/26 704/275 |
| 2006/0265217 A1* | 11/2006 | Bicego | .................... | G10L 15/22 704/231 |
| 2007/0016918 A1* | 1/2007 | Alcorn | .............. | G06F 17/30743 725/22 |

(Continued)

*Primary Examiner* — Vijay B Chawan
(74) *Attorney, Agent, or Firm* — Seyfarth Shaw LLP; Ilan N. Barzilay

(57) ABSTRACT

Devices, methods, and systems for detecting wake words and audio commands that should be disregarded are disclosed. In some instances, a local device may receive a wake word or audible command transmitted or uttered in a television or radio advertisement, program, broadcast, etc. In these instances, the local device should disregard such wake words and audible commands, as they are not from a user of the local device. To detect such wake words and commands, audio fingerprinting and speech recognition techniques may be used to determine whether the wake word and/or command substantially matches the audio of a known television or radio advertisement, program, broadcast, etc. If the wake word and/or command substantially matches, the local device may then disregard the command.

20 Claims, 8 Drawing Sheets

(56) References Cited

U.S. PATENT DOCUMENTS

| | | | |
|---|---|---|---|
| 2008/0117103 A1* | 5/2008 | Wang | G01S 19/34 342/357.74 |
| 2011/0098056 A1* | 4/2011 | Rhoads | G01C 21/20 455/456.1 |
| 2011/0161076 A1* | 6/2011 | Davis | G06F 3/04842 704/231 |
| 2011/0165917 A1* | 7/2011 | Taylor | H04M 1/72569 455/566 |
| 2013/0294648 A1* | 11/2013 | Rhoads | G01C 21/20 701/519 |

* cited by examiner

AUDIBLE COMMAND FILTERING

BACKGROUND

Human-computer interactions have progressed to the point where humans can control computing devices, including gaming devices, and provide input to those devices, by speaking. These devices may employ techniques to identify the words spoken by a human user based on the various qualities of a received audio input. For example, in response to a user spoken wake word or wake command, a device may turn on. Such techniques are called speech recognition or automatic speech recognition (ASR). Speech recognition combined with language processing techniques may allow a user to control a device to perform tasks based on the user's spoken commands. Speech recognition may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
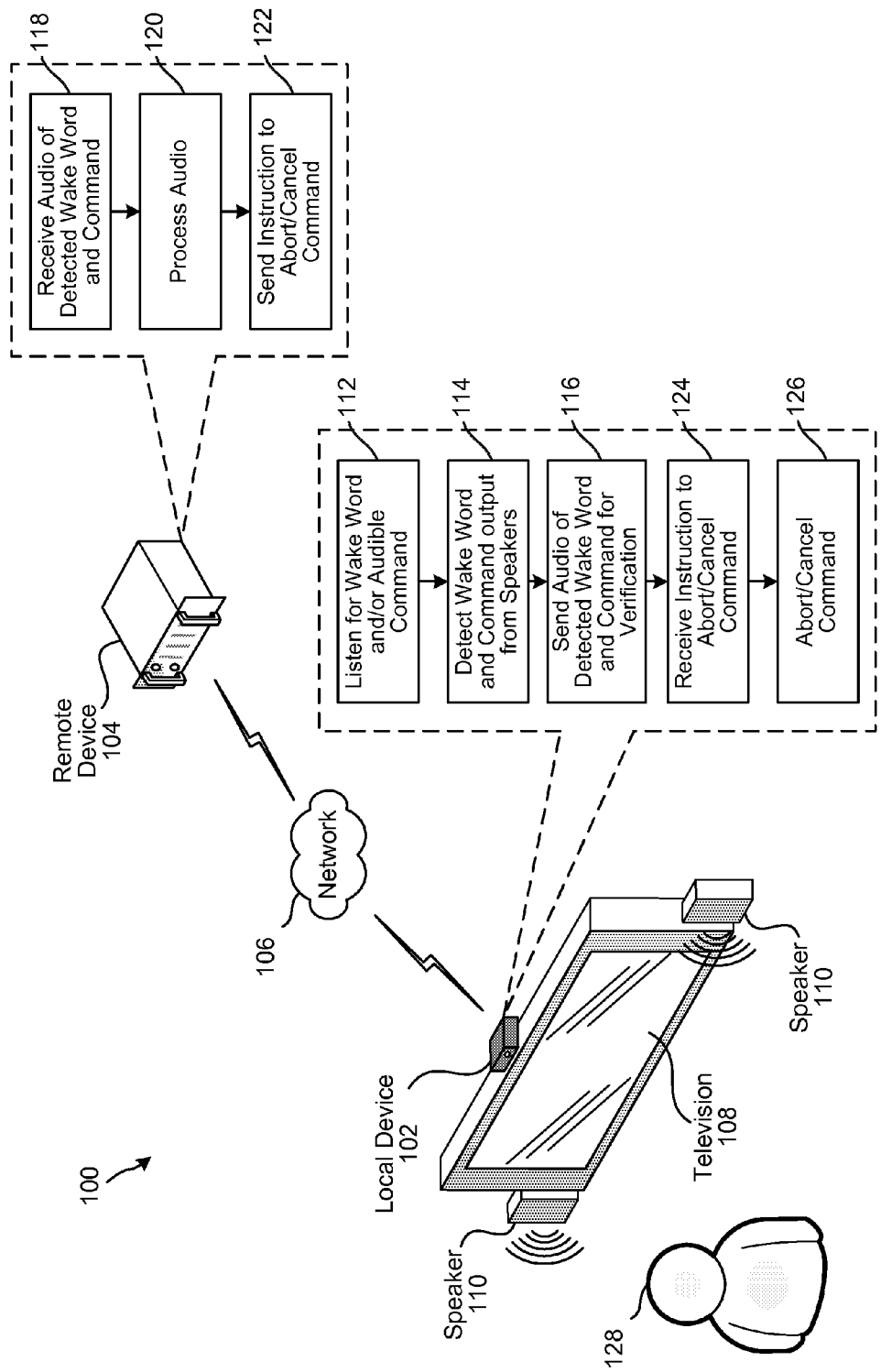
FIG. 1 illustrates an overview of a system for implementing embodiments of the present disclosure.

An increasing number of devices, such as computing devices, mobile devices, gaming consoles and similar devices, employ technology that allows a user to control a device based on spoken commands. Such commands are typically a spoken word or phrase that instruct the device to perform one or more functions, i.e., play music, play a game, etc. A command may start with a wake word, which may be one or more words and/or a phrase. When a device detects the wake word, it may turn on, exit a "sleep" or power save mode or otherwise resume normal activity. For example, a device may be listening for a user to speak a wake word to wake the device up, and when the device hears the wake word, the device may resume normal activity, for example, listening for further audible commands (which may include a wake word) to execute.

One drawback to the use of a wake word is that a device may detect the wake word when the wake word was not spoken with the intention of controlling the device. This is because such devices use techniques to allow for the detection of wake words and commands from multiple users and cannot distinguish between the actual user and wake words or other commands from other devices. For example, if a wake word is spoken and is detected by a device, the device may not necessarily know if the wake word was intended to activate the device or was uttered for some other reason. As a result, the device may inadvertently wake up, even if control of the device was not intended. Similarly, if a command following the wake word is detected by the device, the device may inadvertently execute the command. For present discussion, a wake word that is detected by a device, but should not be used to control the device, is referred to as an inadvertent wake word and a command following a wake word that is detected by a device, but should not be used to control the device, is referred to as an inadvertent command.

One example of such an inadvertent wake word is a wake word that is spoken as part of a television advertisement or show, a radio advertisement, etc. For example, a television advertisement for a particular device may use the wake word and additional commands following the wake word for the device as part of the advertisement. A device that is configured to recognize the wake word may detect the wake word and inadvertently activate in response to detecting the wake word in the audio of the advertisement and execute any commands following the wake word. The people with devices that react to the wake word may experience their devices inadvertently waking up and potentially executing commands following the wake word thereby interfering with the television watching experience. Further, if the advertisement is shown as part of a broadcast watched by a large population (such as during a popular sporting event), the advertisement may result in many devices "waking up" at the same time. If those devices are programmed to connect to a central server upon waking up, the central server may become overwhelmed with many devices activating at the same time. These same principals apply to non-wake words and other commands that may inadvertently cause one or more devices to wake up and/or execute commands. Offered are a number of techniques to avoid responding to inadvertent wake words and executing inadvertent commands.

To avoid responding to an inadvertent wake word and executing an inadvertent audible command (for example, those of advertisements, broadcasts, etc.), a device may have access to stored audio recordings corresponding to inadvertent wake words and inadvertent audible commands, for example, audio samples of commercials, programs, etc. that include the particular wake words and/or command(s). When the device detects a wake word or an audible command, it may compare the audio of the detected wake word or command to audio stored in a data store. If the detected audio matches the stored audio the device may determine that the detected audio is part of an advertisement, etc. and is therefore an inadvertent wake word or command that the device may ignore/disregard/abort/cancel. The device may also send a recording of the detected audio to a remote device for determining whether the detected audio corresponds to a stored audio recording. In some aspects, the device may record and buffer portions of detected audio that precede and/or follow the detected wake word. The preceding and/or following portion(s) may be used to assist in identifying if the detected audio matches a stored audio sample, for example from the advertisement. Similarly, only portions of the detected audio may be captured and compared to stored audio, for example in the case where comparison of only small portions of audio may be sufficient to identify a detected wake word or command as inadvertent. Other techniques may also assist in preventing a device from responding to an inadvertent wake word or executing an inadvertent command. For example, the audio of the advertisement/program including the wake word or other audible command may also be configured to include an audio signal (for example a signal inaudible to humans) that indicates to a detecting device that the audio of the wake word or other audible command in the program is an inadvertent wake word or command and that the device should disregard that particular wake word or command. Other techniques are also possible.

FIG. 1 illustrates an overview of a system 100 for implementing embodiments of the disclosure. The system includes a local device 102 and a remote device 104 in communication with one another via a network 106. The local device 102 may be configured to receive and respond to wake words and execute audible commands. In an example, the local device 102 may be listening for a wake word or an audible command to operate the local device 102, for example, illustrated as block 112. While the local device 102 is listening for the wake word, a user 128 may be watching television, via television 108, and a broadcast, advertisement, or other television program may use the wake word potentially followed by an audible command and the wake word and audible command may be projected through speakers 110 of the television 108. As illustrated, the wake word and audible command in this instance does not originate from the user 128 intending to control the local device 102, but rather from some program or other media being viewed near the local device 102. In this instance, the local device 102 may detect the wake word and audible command that is projected through the speakers 110, illustrated as block 114.

Prior to executing the command or in parallel to executing the command, the local device 102 may send audio including the detected wake word and audible command to the remote device 104 for verification of the wake word and/or audible command, illustrated as block 116. The sent audio may include the detected wake word and optionally the audible command itself, portions of the detected wake word and/or audible command, audio preceding and/or following the detected wake word and/or, a signal inaudible to humans embedded in or near the wake word and/or audible command, etc. The remote device 104 receives the sent audio of the detected wake word and/or audible command, illustrated as block 118, and processes the audio, illustrated as block 120. The processing may include comparing the sent audio to stored audio to determine whether the detected wake word and/or audible command in the sent audio corresponds to stored audio including the wake word and/or audible command that should be disregarded (i.e., is an inadvertent wake word or audible command), illustrated as block 120. For example, the remote device 104 may include a data store of known utterances of wake word and/or audible commands in television and/or radio advertisements, programs, broadcasts, etc. and compare the sent audio to the stored utterances using audio fingerprinting and/or other speech/audio comparison techniques. The remote device 104 may also store known audio sequences preceding and/or following utterances of wake words and/or audible commands in television and/or radio advertisements, programs, broadcasts, etc. and use those in the comparison process. The remote device 104 may also process the recording to detect a signal inaudible to humans embedded in the wake word and/or audible command to determine whether the wake word and/or audible command is an instance of an utterance of a wake word and/or audible command in television and/or radio advertisements, programs, broadcasts, etc.

In this example, the remote device 104 determines that the recording of the wake word corresponds to an advertisement that was broadcast via a television network. Thus, the remote device 104 sends an instruction to the local device 102 instructing the local device 102 to disregard/abort/cancel processing/execution of the audible command, illustrated as block 122. The local device 102 receives the instruction, illustrated as block 124, and disregards/aborts/cancels processing the audible command, illustrated as block 126.

In an example, the local device 102 may be in a standby or power save mode and the inadvertent wake word may be followed by a command. In this example, the local device 102 may detect the wake word and exit the standby or power save mode and begin processing the command. Once it is determined that the wake word was inadvertent, the local device 102 may disregard/abort/cancel processing/execution of the command and reenter the standby or power save mode.

In an embodiment, the local device 102 may, on its own process the wake word or audible commands to determine whether they are inadvertent without sending the audio to the remote device 104. In this embodiment, the local device 102 may have a local storage component (or access to a remote storage component), where the storage component stores audio files or other data (such as data regarding the embedded signal inaudible to humans) that the local device 102 may use to determine if the wake word and/or audible command is inadvertent. In this embodiment, the local device 102 may perform step 120 discussed in FIG. 1. Thus, either the local device 102 or the remote device 104 may include the components to determine whether a wake word and/or audible command is inadvertent.

Figure 2:
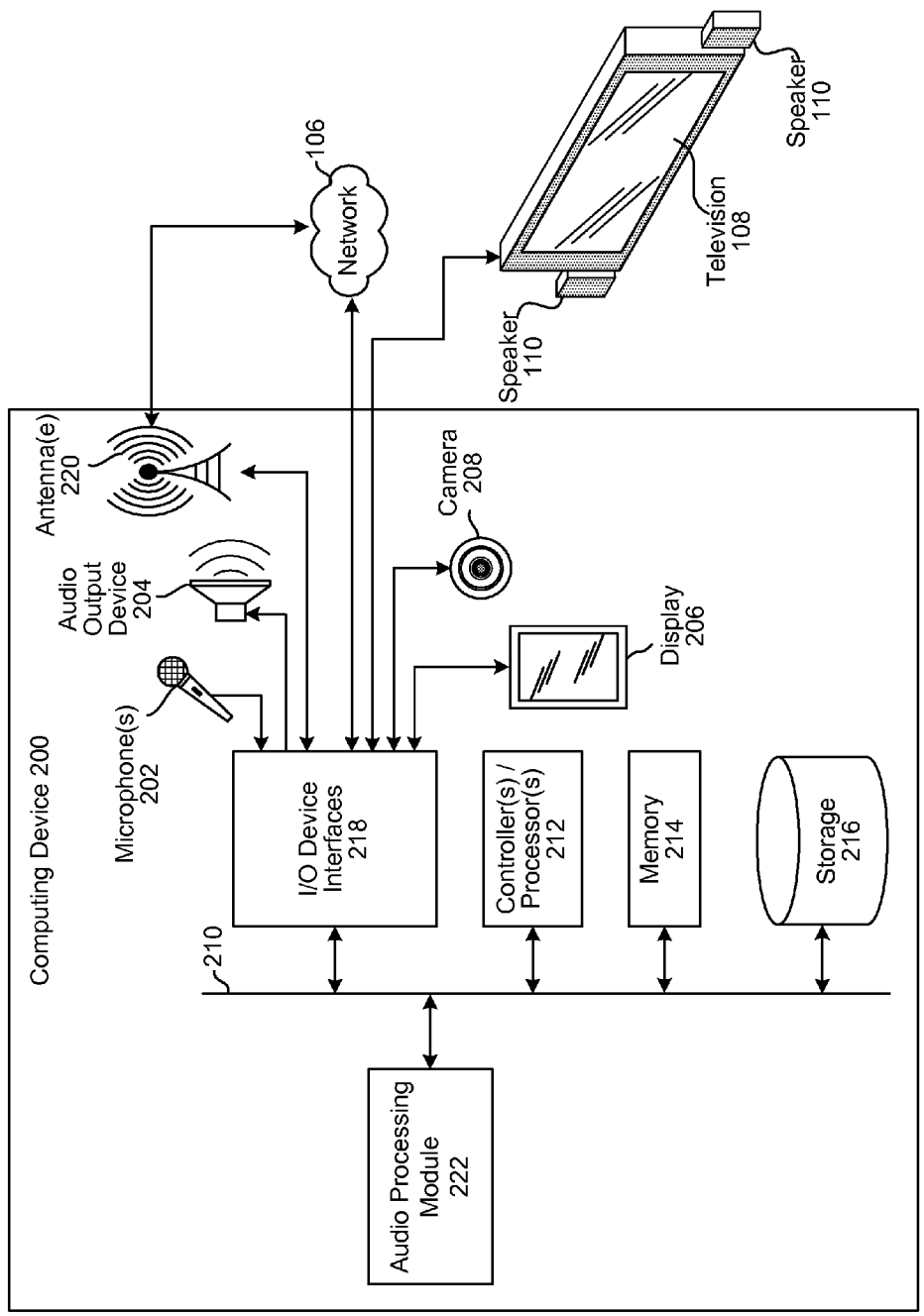
FIG. 2 is a block diagram conceptually illustrating an exemplary device according to embodiments of the present disclosure.

FIG. 2 is a block diagram conceptually illustrating example components of a computing device 200, which may be the local device 102 and/or the remote device 104. In operation, the computing device 200 may include computer-readable and computer-executable instructions that reside on the computing device 200, as will be discussed further below.

The computing device 200 may include one or more audio capture device(s), such as a microphone or an array of microphones 202, for receiving and capturing wake words and audible commands and other audio. The computing device 200 may also include an audio output device for producing sound, such as speaker(s) 204. The audio capture device(s) and/or the audio output device may be integrated into the computing device 200 or may be separate. For example, the speaker(s) 204 may be the speakers 110 which are separate from and coupled to the local device 104 through the television 108. Additionally or alternatively, the computing device 200 may connect to the television 108.

The computing device 200 may include a video output device for displaying images, such as display 206. The video output device may be a display of any suitable technology, such as a liquid crystal display, an organic light emitting diode display, electronic paper, an electrochromic display, a cathode ray tube display, a pico projector or other suitable component(s). The computing device 200 may also include a video/image capture device for capturing images and video, such as camera 208. The video output device and/or video/image capture device may be integrated into the computing device 200 or may be separate. For example, the display 206 may be the television 108 which is separate from and in communication with the local device 104. Additionally or alternatively, the computing device 200 may connect to the television 108.

The computing device 200 may include an address/data bus 210 for conveying data among components of the computing device 200. Each component within the computing device 200 may also be directly connected to other components in addition to (or instead of) being connected to other components across the bus 210.

The computing device 200 may include one or more controllers/processors 212 that may each include a central processing unit (CPU) for processing data and computer-readable instructions, and a memory 214 for storing data and instructions. The memory 214 may include volatile random access memory (RAM), non-volatile read only memory (ROM), non-volatile magnetoresistive (MRAM) and/or other types of memory. The computing device 200 may also include a data storage component 216, for storing data and controller/processor-executable instructions (e.g., instructions to perform the algorithms and methods illustrated in and described with reference to FIGS. 1 and 4-8). The data storage component 216 may include one or more non-volatile storage types such as magnetic storage, optical storage, solid-state storage, etc. The computing device 200 may also be connected to removable or external non-volatile memory and/or storage (such as a removable memory card, memory key drive, networked storage, etc.) through the input/output device interfaces 218.

Computer instructions for operating the computing device 200 and its various components may be executed by the controller(s)/processor(s) 212, using the memory 214 as temporary "working" storage at runtime. The computer instructions may be stored in a non-transitory manner in non-volatile memory 214, storage 216, or an external device. Alternatively, some or all of the executable instructions may be embedded in hardware or firmware in addition to or instead of software.

The computing device 200 includes input/output device interfaces 218. A variety of components may be connected through the input/output device interfaces 218, such as the display 206, the speaker(s) 204, the microphones 202, the camera 208, the television 108, and/or other such components. The input/output device interfaces 218 may also include an interface for an external peripheral device connection such as universal serial bus (USB), FireWire, Thunderbolt or other connection protocol. The input/output device interfaces 218 may also include a connection to one or more networks 106 via an antennae 220, Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The computing device 200 further includes an audio processing module 222 that receives the captured audio of detected wake words and audible commands and any additional audio captured in the recording, and processes the audio to determine whether the recording corresponds to an utterance of the wake words and/or audible command that should be disregarded (i.e., is inadvertent). The storage 216 may store data (for example, audio fingerprints, comparison audio or other data) relating to known utterances of wake words and commands in television and/or radio advertisements, programs, broadcasts, etc. that a device should disregard. The storage 216 may also store known signals that are inaudible to humans and embedded in the wake words and audible command. Although illustrated as incorporated within the computing device 200, the storage 216 may be located separately and accessed by the computing device 200 (for example, over network 106).

The audio processing module 222 may access the storage 216 and compare the captured audio to the stored utterances and audio sequences using audio comparison techniques. The audio processing module 222 may also, or in the alternative, process the captured audio to detect a signal inaudible to humans embedded in the audible command to determine whether the wake words and/or audible command is an instance of an utterance of a wake word or audible command in television and/or radio advertisements, programs, broadcasts, etc.

To process the recording/captured wake words and/or audible commands, the audio processing module 222 may employ audio fingerprinting techniques and other speech/audio comparison techniques. For example, the audio processing module 222 may use audio or acoustic fingerprinting techniques. In this aspect, a digital summary of audio including an inadvertent wake word and/or audible command may be generated based on frequency, intensity, time, and other parameters of the audio. This digital summary may then be stored and compared to audio or acoustic fingerprints of captured audio including the wake word and/or audible command.

In one embodiment the audio processing module 222 may include speech recognition capabilities to convert audio to text. The computing device 200 may compare text resulting from the captured audio to stored text of an advertisement, etc. In this example, the computing device 200 may compare more than just the words of the wake word and/or command (for example, a certain number of words before and/or after the captured audible command) to determine if the wake word and/or command should be disregarded.

The audio processing module 222 may use Hidden Markov Models (HMMs), Gaussian mixture models, and/or large vocabulary continuous speech recognition (LVCSR) based on HMMs and Gaussian mixture models. The HMMs and/or Gaussian mixture models may be applied to compare the audio input to one or more acoustic models that are based on stored audio of inadvertent wake words and/or audible commands. In general, HMMs are used to determine probabilities that feature vectors may match phonemes. Using HMMs, a number of states are presented, in which the states together represent a potential phoneme and each state is associated with a model, such as a Gaussian mixture model. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed, the state may change or stay the same, based on the processing of the new feature vectors. A Viterbi algorithm may be used to find the most likely sequence of states based on the processed feature vectors.

In another example, the audio processing module 222 may use phrase models. A phrase model may be created for each inadvertent wake word and/or audible command. When identifying whether a captured wake word and/or audible command matches an inadvertent wake word and/or audible command, acoustic models for the inadvertent wake word and/or audible command may be compared to the captured wake word and/or audible command. In one aspect, the phrase models may be created based on phoneme models (or other subword units). In this aspect, a phoneme model is akin to an acoustic model. A custom HMM may also be created for each inadvertent wake word and/or audible command by concatenating the HMM states for the relevant phonemes together. In this aspect, a custom HMM for each inadvertent wake word and/or audible command may be created based on the stored audio.

The computing device 200 may include all or a subset of the components described above. Through the network 106, one or more components may be distributed across a networked environment. For example, multiple computing devices 200 (such as the local device 102 and the remote device 104) may be employed in a system. In such a multi-device system, each of the computing devices 200 may include different components for performing different aspects of the processes described herein. The multiple devices may include overlapping components. The components of the computing device 200 as illustrated in FIG. 2 is exemplary, and may be a stand-alone device or may be included, in whole or in part, as a component of a larger device or system.

The concepts disclosed herein may be applied within a number of different devices and computer systems, including, for example, general-purpose computing systems, multimedia set-top boxes, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

Figure 3:
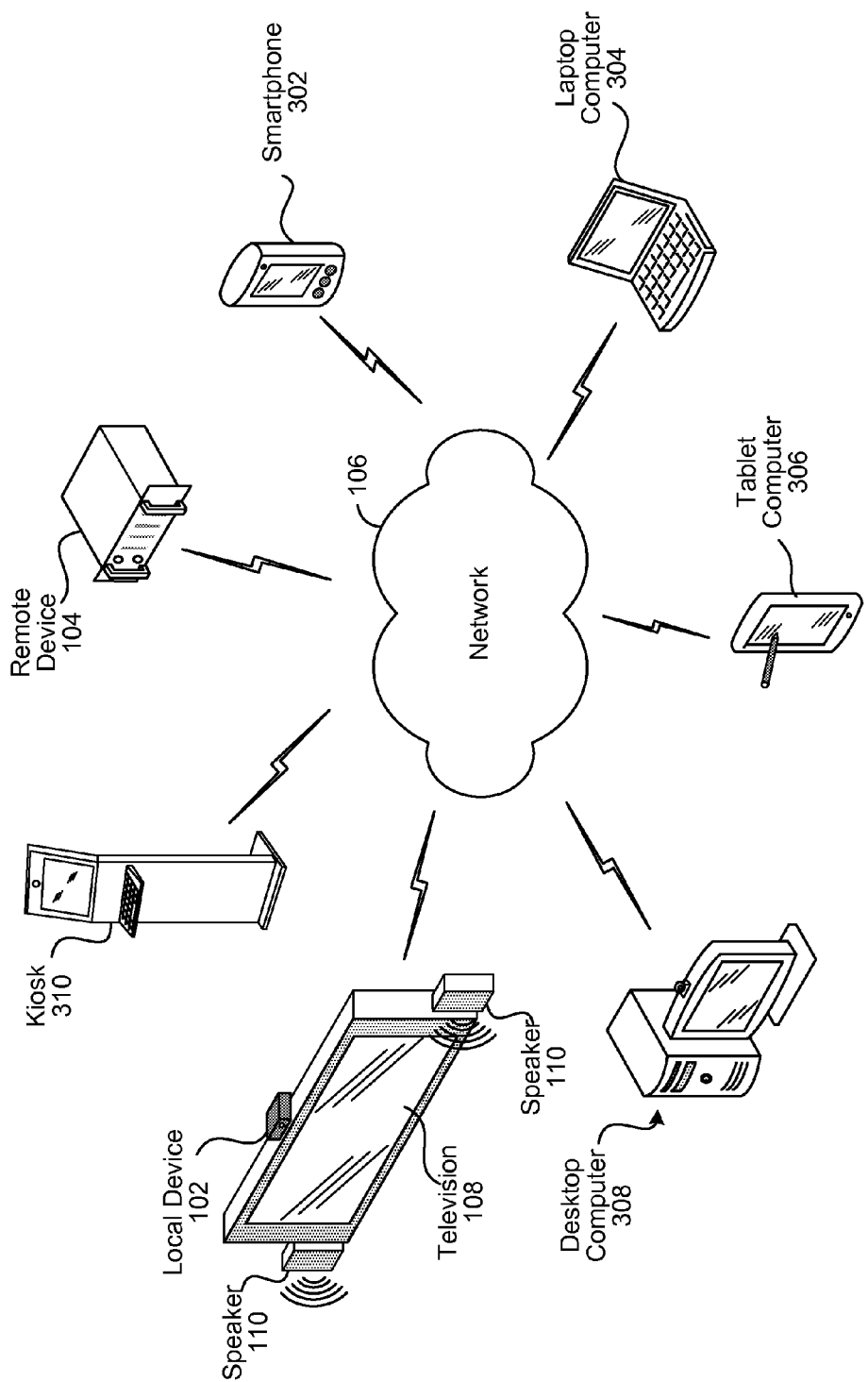
FIG. 3 illustrates a computer network for use with distributed processing according to embodiments of the present disclosure.
Figure 4:
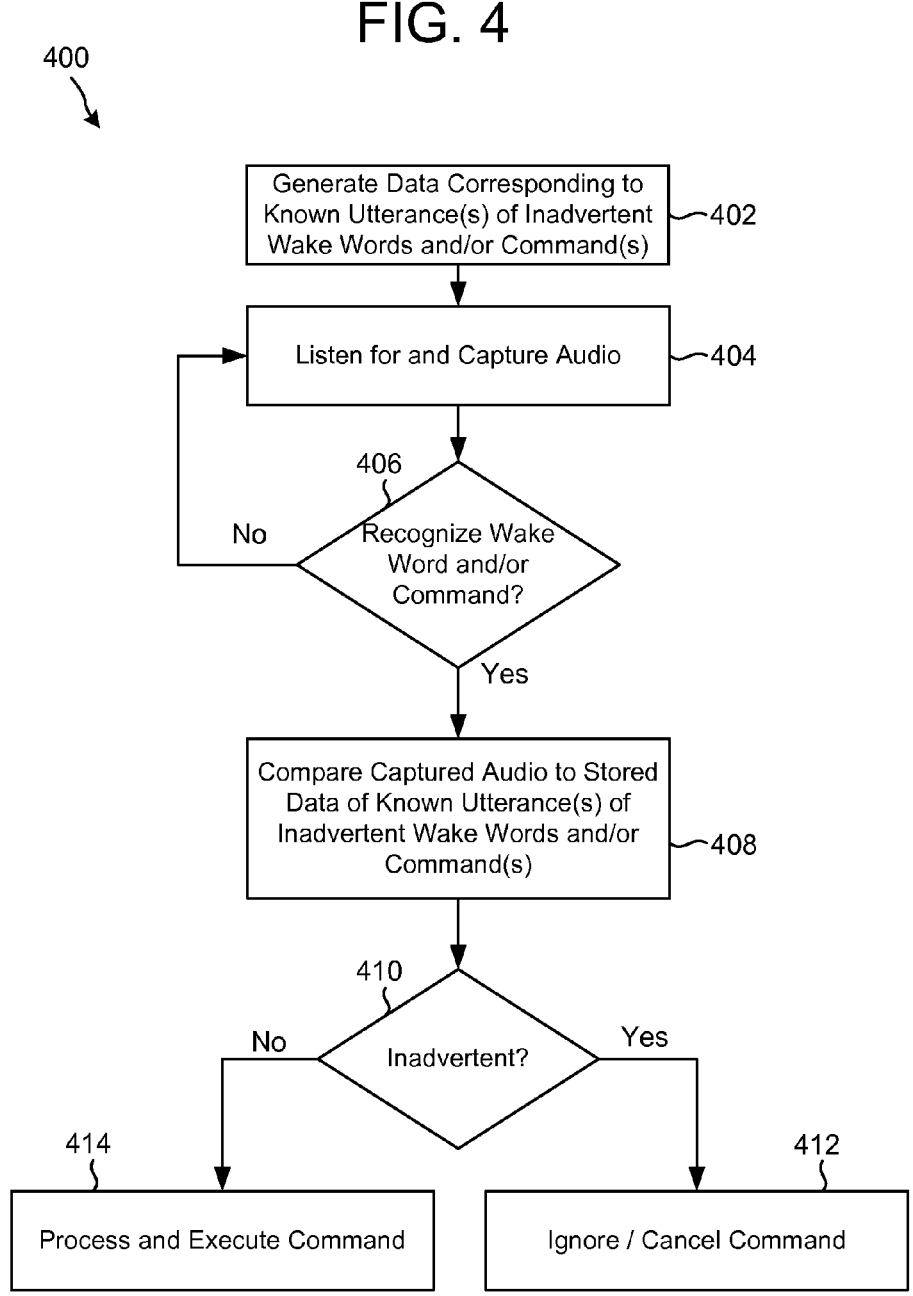
FIG. 4 illustrates an exemplary method of detecting inadvertent wake words and audible commands according to embodiments of the present disclosure.
Figure 5:
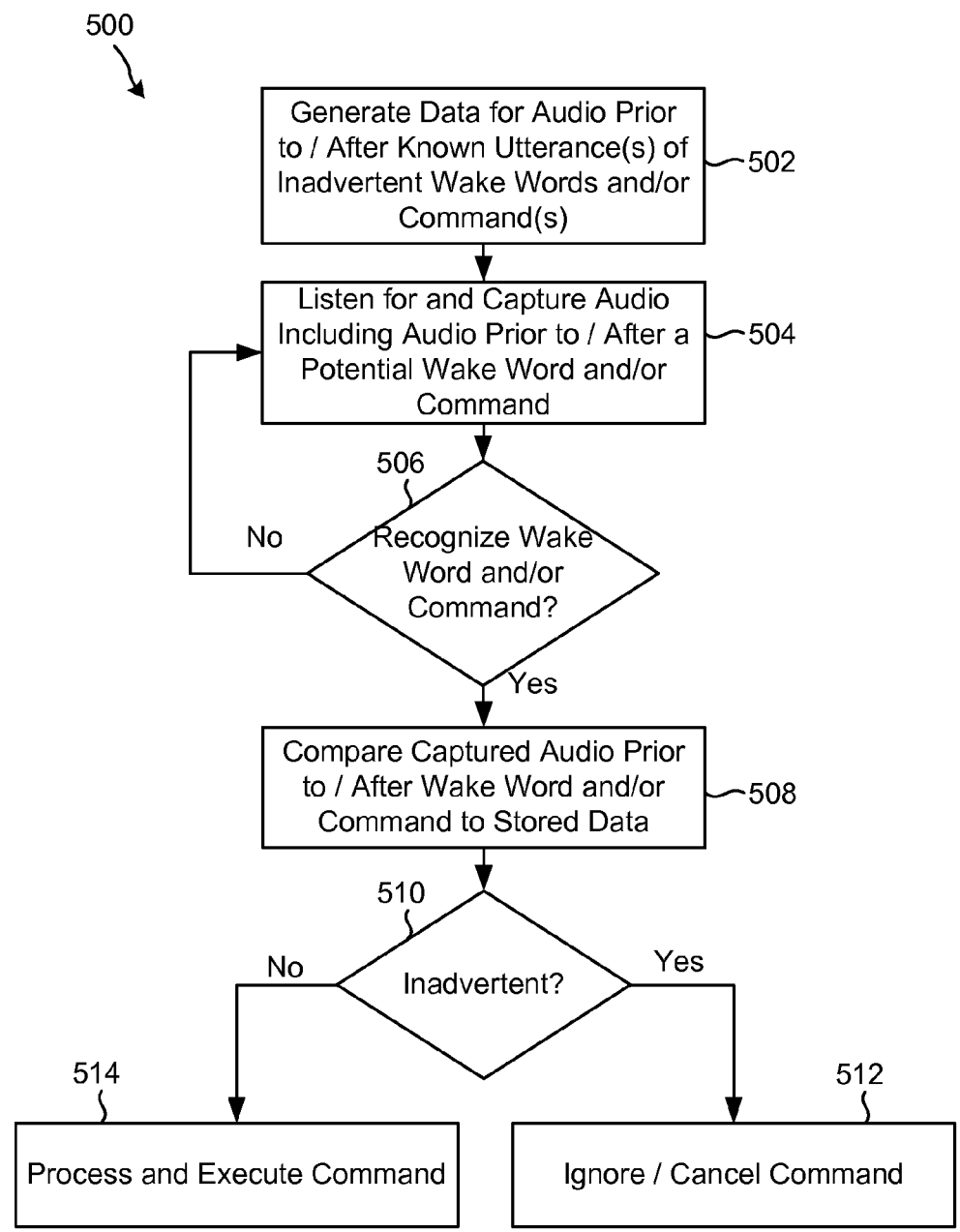
FIG. 5 illustrates another exemplary method of detecting inadvertent wake words and audible commands according to embodiments of the present disclosure.
Figure 6:
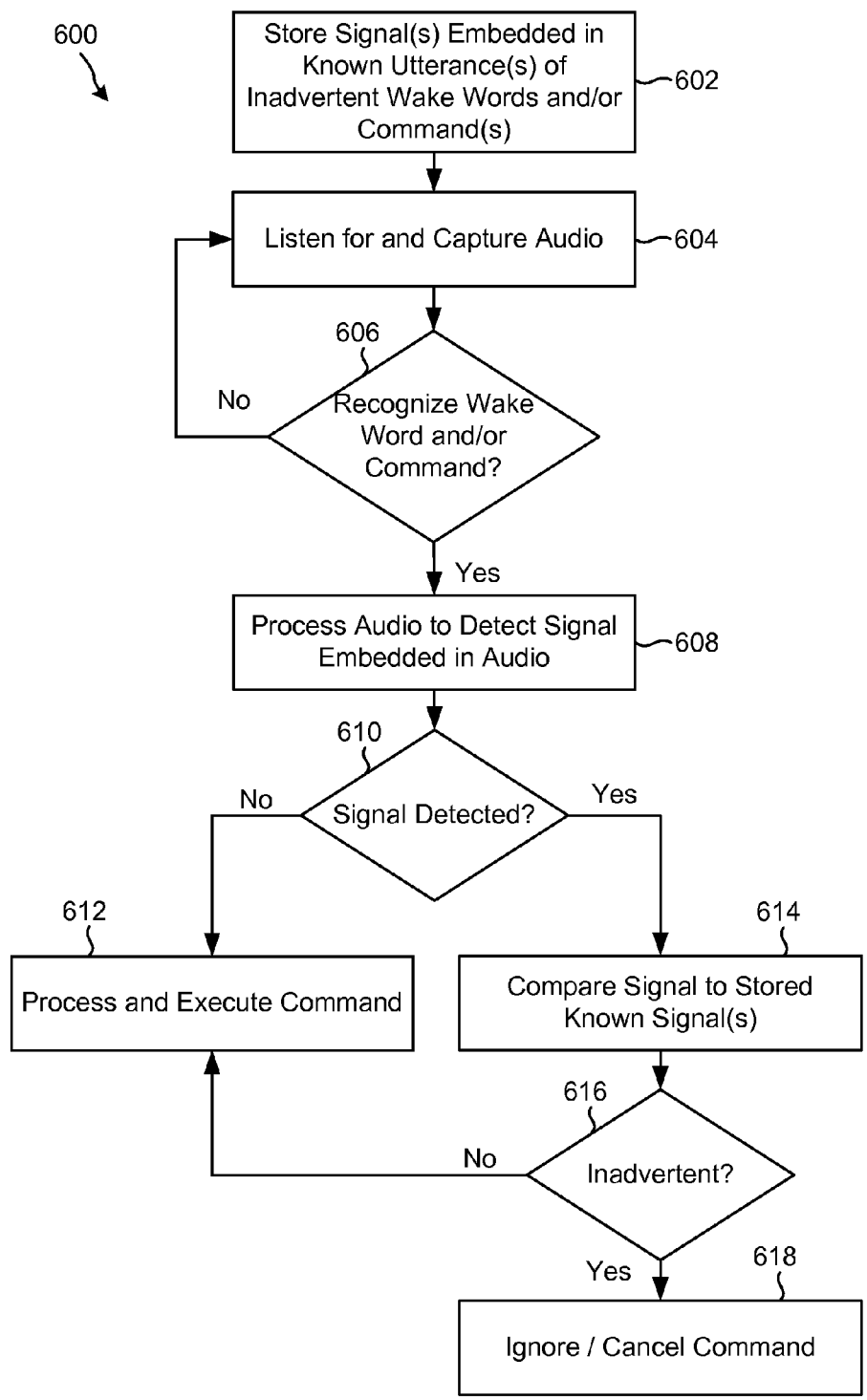
FIG. 6 illustrates another exemplary method of detecting inadvertent wake words and audible commands according to embodiments of the present disclosure.
Figure 7:
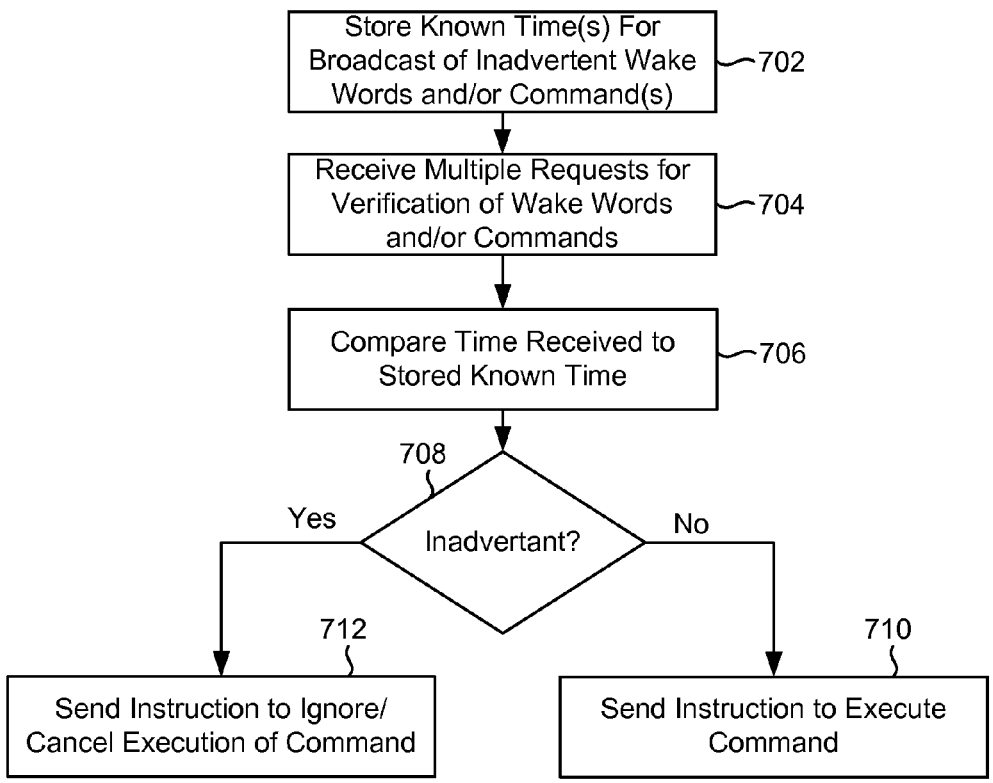
FIG. 7 illustrates another exemplary method of detecting inadvertent wake words and audible commands according to embodiments of the present disclosure.
Figure 8:
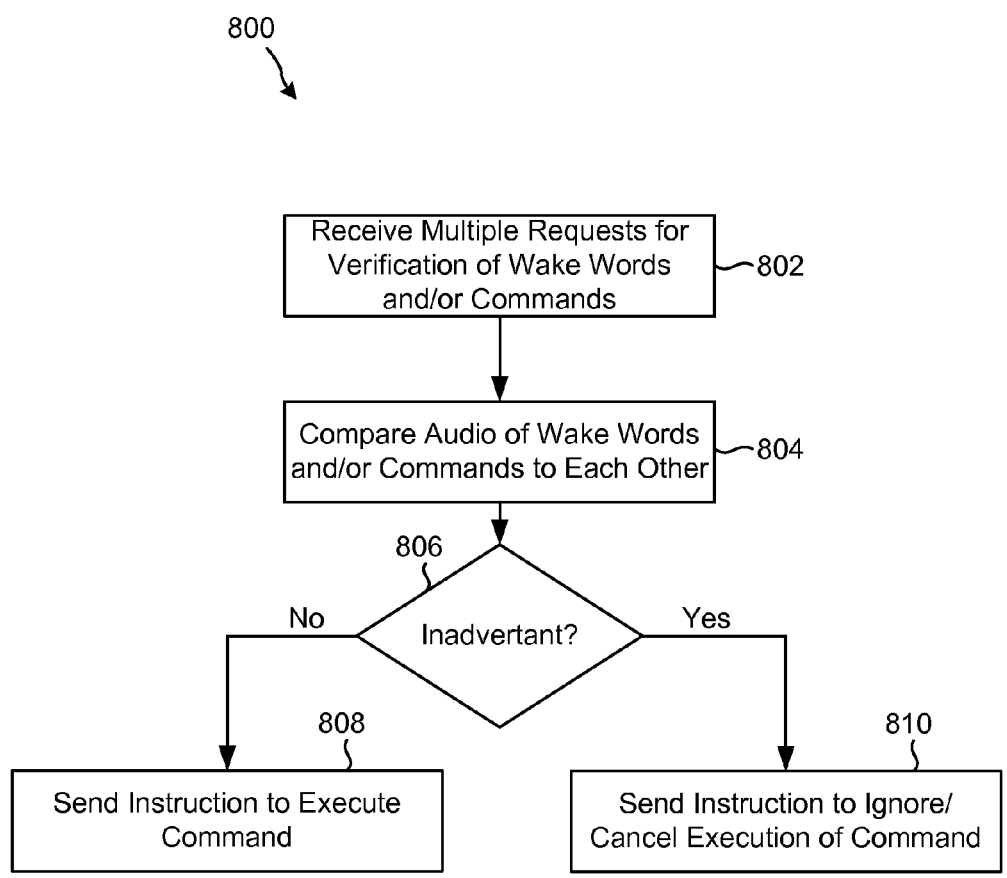
FIG. 8 illustrates another exemplary method of detecting inadvertent wake words and audible commands according to embodiments of the present disclosure.

As illustrated in FIG. 3, multiple devices (102, 104, 108, 110 and 302-310) may contain components of the system 100 and the devices may be connected over the network 106. Network 106 may include a local or private network or may include a wide network such as the internet. Devices may be connected to the network 106 through either wired or wireless connections. For example, a smartphone 302, a laptop computer 304, a tablet computer 306, a desktop computer 308, a kiosk 310, and the local device 102, television 108, and remote device 104 may be connected to the network 106 through a wireless service provider, over a WiFi or cellular network connection or the like, or a wired connection. These networked devices may include embedded audio input devices, such as an internal microphone and speaker, and one or more of the devices may include an audio processing module.

In certain system configurations, one device may capture audio relating to wake words and/or audible commands and another device may process the captured audio to determine whether the captured audio corresponds to an utterance of the wake word and/or audible command that should be disregarded (i.e., is inadvertent) or to a verifiable wake word and/or audible command that should be acted upon or executed. For example, the local device 102, television 108, smartphone 302, laptop computer 304, tablet computer 306, desktop computer 308, and/or kiosk 310 may be configured to receive and respond to wake words and execute audible commands. In this example, the local device 102, television 108, smartphone 302, laptop computer 304, tablet computer 306, desktop computer 308, and/or kiosk 310 may capture audio relating to the utterance of a wake word and/or audible command. Because processing the captured audio may involve significant computational resources (for example, comparing the captured audio with many stored audio samples in a short amount of time), in terms of both storage and processing power, such split configurations may be employed where the remote device 104 performs the processing of the audio and sends a verification or disregard/cancel instruction based on the results of the processing.

FIGS. 4-8 illustrate exemplary methods of processing the captured audio containing a wake word and/or audible command according to embodiments of the present disclosure. It should be appreciated that each of the methods described with reference to FIGS. 1 and 4-8 may be combined with one or more of the other methods, and one or more steps of a methods may be incorporated into the other methods. Further, one or more of the components described above with reference to FIG. 2 may be used to perform the steps of the methods described herein.

In an exemplary embodiment, audio fingerprinting techniques and/or speech model techniques may be used to identify and detect inadvertent wake words and/or audible commands. A method 400 of detecting an inadvertent wake word and/or audible command is described with reference to FIG. 4. As illustrated in block 402, data corresponding to one or more known utterances of inadvertent wake words and/or audible commands is created or generated. The data may be audio fingerprints, speech models, and other data corresponding to other audio processing techniques. These known utterances may include utterances of wake words and/or audible commands in television and/or radio advertisements, programs, broadcasts, etc. In an example, the data may be audio fingerprints, i.e., condensed summaries of audio signals that can be used to identify an audio sample. The audio fingerprints may be generated by analyzing one or more of frequency, intensity, and other parameters of audio containing the inadvertent wake word and/or audible command that can be used later to identify whether captured audio matches the audio of the program. In another example, the data may be speech models generated by analyzing audio containing the inadvertent wake word and/or audible command, and preparing a model that can be compared against captured utterances of wake words and/or audible commands to determine whether a captured utterance of a wake word and/or audible command is an inadvertent wake word and/or audible command. The data may be generated by the local device and/or the remote device. For example, the remote device may generate the data ahead of time (for example, before the program in question is broadcast) and may store the data in a manner accessible to the remote device. The remote device may also send such data to the local device to allow the local device to compare captured utterances to the data.

For example, the local device may listen for and capture audio, illustrated as block 404. It may then be determined whether the captured audio includes a wake word and/or audible command, illustrated as block 406. The determination of whether the captured audio includes a wake word and/or audible command may be performed using various audio processing techniques. Such techniques may be flexible, in that the detection of a wake word and/or command may be performed and recognized no matter who speaks the wake word and/or command or whether the wake word and/or command is being transmitted through a speaker of a device.

When no wake word and/or audible command is recognized in the captured audio, the method returns to block 404 and the local device listens for and captures audio. When a wake word and/or audible command is recognized, the captured audio and/or data corresponding to the captured audio may then be compared to one or more of the data corresponding to one or more of the known utterances of inadvertent wake words and/or audible commands, illustrated as block 408, to determine whether the captured audio substantially corresponds to a known utterance of an inadvertent wake word and/or audible command, illustrated as block 410. For example, a score relating to the captured audio matching a known utterance of an inadvertent wake word and/or audible command may be generated and compared to a configurable threshold value. The threshold value may be, for example, a 90% match, a 95% match, or other value corresponding to a substantial match.

Further, the determination as to whether the captured audio substantially corresponds to a known utterance of an inadvertent wake word and/or audible command may incorporate one or more additional criteria. For example, whether the local device is in a standby or power save mode prior to detecting the wake word and/or audible command, whether the local device is in an active mode or was recently used (such as within the last 1-5 minutes/seconds, etc.) when the wake word and/or audible command is detected, how long it has been since a wake word and/or audible command was detected and executed by the local device, one or more of the additional methods described herein, etc. to determine whether the captured audio substantially corresponds to a known utterance of an inadvertent wake word and/or audible command.

When the audio fingerprint of the captured audio substantially corresponds to the stored audio fingerprint of a known inadvertent wake word and/or audible command (i.e., the comparison is greater than/equal to the threshold), the wake word and/or audible command corresponding to the captured audio may be disregarded/aborted/cancelled, illustrated as block 412. For example, as described above, the local device may be in a standby or power save mode and an inadvertent wake word followed by a command may be detected. In this example, the local device may detect the wake word and exit the standby or power save mode and begin processing the command. Once it is determined that the wake word was inadvertent, the local device may disregard/abort/cancel processing/execution of the command and reenter the standby or power save mode.

Alternatively, when the captured audio does not substantially match the stored audio fingerprint (i.e., the comparison is less than the threshold), the wake word and/or audible command corresponding to the captured audio may be processed, for example, by the local device, illustrated as block 414. In this case, the wake word and/or audible command corresponding to the captured audio is determined to be an utterance of a wake word and/or audible command by a user, and the local device may execute the command. It should be appreciated that one or more steps may be performed by the local device and one or more steps may be performed by other devices. For example, the steps described with respect to blocks 402 and 408-410 may be performed by a remote device and an instruction relating to blocks 412 or 414 may be sent from the remote device to the local device.

In another exemplary embodiment, television and radio advertisements, broadcasts, programs, etc. may have audio portions preceding and/or following an utterance of a wake word and/or audible command that may be used to signify that the wake word and/or audible command is inadvertent and should be disregarded. For example, an advertisement for a device may include other spoken words, sounds, or other audio before or after the wake word and/or audible command of interest. That other audio may be used to identify the advertisement and recognize that the system should disregard the wake word and/or audible command. A method 500 of detecting an inadvertent wake word and/or audible command based on audio surround the utterance of the wake word and/or audible command is described with reference to FIG. 5. As illustrated in block 502, data (such as speech models and/or audio fingerprints) is created for audio that precedes and/or follows one or more known utterances of inadvertent wake words and/or audible commands.

A device, for example, the local device, may listen for and capture audio including buffering audio prior to and following a potential utterance of a wake word and/or audible command, illustrated as block 504. In this embodiment, the captured audio includes sounds and/or spoken words that precede and/or follow the potential utterance of the wake word and/or audible command.

It may then be determined whether the captured audio includes a wake word and/or audible command, illustrated as block 506. When no wake word and/or audible command is recognized in the captured audio, the method returns to block 504 and the local device listens for and captures audio. When a wake word and/or audible command is recognized, the captured audio of the sounds and/or spoken words that precede and/or follow the potential utterance of the wake word and/or audible command may then be compared to the data corresponding to the known sounds and/or spoken words that precede and/or follow utterances of inadvertent wake words and/or audible commands, illustrated as block 508, to determine whether the captured audio substantially corresponds to an inadvertent wake word and/or audible command, illustrated as block 510. For example, as described above, a score of the captured audio matching known sounds and/or spoken words that precede and/or follow an utterance of an inadvertent wake word and/or audible command may be generated and compared to a configurable threshold value. As described above, one or more additional criteria and/or the methods described herein may also be used to make the determination.

When the comparison is greater than/equal to the threshold, the wake word and/or audible command corresponding to the captured audio may be disregarded/aborted/cancelled, illustrated as block 512. Alternatively, when the comparison is less than the threshold, the wake word and/or audible command corresponding to the captured audio may be executed, illustrated as block 514. It should be appreciated that one or more steps may be performed by the local device and one or more steps may be performed by other devices. For example, the steps described with respect to blocks 502 and 508-510 may be performed by a remote device and an instruction relating to blocks 512 or 514 may be sent from the remote device to the local device.

In another exemplary embodiment, a signal or echo may be superimposed or embedded in a television and/or radio advertisement, broadcast, etc. that may be used like a watermark to signify that the wake word and/or audible command is an inadvertent wake word and/or audible command and should be disregarded. The signal may be outside the frequency range audible to humans (20 Hz-20,000 Hz) or may otherwise be configured to be inaudible to humans so as not to interfere with the program. A method 600 of detecting an inadvertent wake word and/or audible command based on a signal embedded in the wake word and/or audible command is described with reference to FIG. 6. As illustrated in block 602, known signals that are embedded in the audio of one or more known utterances of inadvertent wake words and/or audible commands are stored, for example in a data store or storage. A device, such as, the local device, may listen for and capture audio, illustrated as block 604.

It may then be determined whether the captured audio includes a wake word and/or audible command, illustrated as block 606. When no wake word and/or audible command is recognized in the captured audio, the method returns to block 604 and the local device listens for and captures audio. When a wake word and/or audible command is recognized, the captured audio may be processed, illustrated as block 608, to determine whether a signal is detected and/or embedded in the captured audio, illustrated as block 610. When no signal is detected, the wake word and/or audible command corresponding to the captured audio may be executed, illustrated as block 612.

However, when a signal is detected, the signal may be compared to the one or more stored known signals, illustrated as block 614, to determine whether the captured audio corresponds to a known inadvertent wake word and/or command, illustrated as block 616. For example, a score of the captured signal matching the stored known signals may be generated and compared to a configurable threshold value. Optionally, the signal may be isolated prior to comparing the one or more stored known signals. When the captured signal substantially matches a stored known signal (i.e., the comparison is greater than/equal to the threshold), the wake word and/or audible command corresponding to the captured audio may be an inadvertent wake word and/or command and may be disregarded/aborted/cancelled, illustrated as block 618. Alternatively, when the captured signal does not substantially match a stored known signal (i.e., the comparison is less than the threshold), the wake word and/or audible command corresponding to the captured audio may be executed, for example, by the local device, illustrated as block 612. It should be appreciated that one or more steps may be performed by the local device and one or more steps may be performed by other devices. For example, the steps described with respect to blocks 602, 608-610, and 614-616 may be performed by a remote device and an instruction relating to blocks 612 or 618 may be sent from the remote device to the local device.

In another exemplary embodiment, a known time of broadcast or airing of an advertisement or program that utters an inadvertent wake word and/or audible command and/or the fact that numerous substantially similar wake word and/or audible commands are sent to the remote device for verification may be used to signify that the audible command is an inadvertent wake word and/or audible command and should be disregarded. A method 700 of detecting an inadvertent wake word and/or audible command based on a known time frame is described with reference to FIG. 7. As illustrated in block 702, known times for airing and/or broadcasting of inadvertent wake words and/or audible commands are stored, for example in a data store or storage. A remote device responsible for verification of wake words and/or audible commands for local devices may receive multiple requests for verification of wake words and/or audible commands at substantially a same time, illustrated as block 704. In one aspect, the remote device may compare the time(s) of the received requests to the known times for airing and/or broadcasting of inadvertent wake words and/or audible commands, illustrated as block 706, to determine whether the time(s) of the received requests are substantially similar to a stored known time and correspond to an inadvertent wake word and/or command, illustrated as block 708. When the times are not substantially similar, the remote device may send an instruction to the local device verifying the wake word and/or audible command and/or instructing the local device to execute the audible command, illustrated as block 710. However, when the times are substantially similar, the remote device may send an instruction to the local device aborting/cancelling the wake word and/or audible command and/or instructing the local device to disregard the audible command, illustrated as block 712.

In another aspect, the remote device may compare captured audio of received requests to each other to determine whether the requests are substantially similar and therefore relate to an inadvertent wake word and/or audible command. A method 800 of detecting an inadvertent wake word and/or audible command based on an amount of verification requests of a similar audio is described with reference to FIG. 8. A remote device responsible for verification of audible commands for local devices may receive multiple requests for verification of wake words and/or audible commands at substantially a same time, illustrated as block 802. In this aspect, the remote device may compare the captured audio of the received requests to each other, illustrated as block 804, to determine whether the requests are substantially similar and therefore relate to an inadvertent wake word and/or audible command, illustrated as block 806. When the audio of the requests are not substantially similar, the remote device may send an instruction to the local device verifying the wake word and/or audible command and/or instructing the local device to execute the audible command, illustrated as block 808. However, when the audio of the requests are substantially similar, the remote device may send an instruction to the local device cancelling the wake word and/or audible command and/or instructing the local device to disregard the audible command, illustrated as block 810.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, digital imaging and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more components of the computing device 200 may be implemented as firmware or as a state machine in hardware. For example, at least the audio processing module 222 may be implemented as an application specific integrated circuit (ASIC), a digital signal processor (DSP), a field programmable gate array (FPGA), or some combination thereof.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for detecting audio commands that should be disregarded, comprising:
generating a first audio fingerprint corresponding to a first utterance of a first wake word in an advertisement;
storing the first audio fingerprint as a stored reference audio fingerprint;
obtaining an indication of a second wake word and a subsequent audible command in a second utterance;
generating a second audio fingerprint corresponding to the second wake word;
comparing the second audio fingerprint to the stored reference audio fingerprint;
determining that the second audio fingerprint substantially matches the stored reference audio fingerprint; and
sending an instruction to abort the subsequent audible command.

2. The computer-implemented method of claim 1, wherein:
generating the first audio fingerprint includes generating the first audio fingerprint corresponding to the first utterance of the first wake word in the advertisements and at least a portion of audible sound preceding or subsequent to the first wake word in the advertisement; and
generating the second audio fingerprint includes generating the second audio fingerprint corresponding to the second wake word and at least a portion of audible sound preceding or subsequent to the second wake word.

3. A computer-implemented method, comprising:
receiving a first utterance from a device, the first utterance including an audible command;
determining first data corresponding to the first utterance;
obtaining second data corresponding to a second utterance, wherein the second utterance is not received from the device;
comparing the first data corresponding to the first utterance to the second data corresponding to the second utterance; and
cancelling processing of the first utterance in response to the first data substantially matching the second data.

4. The computer-implemented method of claim 3, further comprising:
generating a reference audio fingerprint corresponding to the second utterance, wherein the second data includes the reference audio fingerprint; and
generating a first audio fingerprint corresponding to the first utterance, wherein the first data includes the first audio fingerprint.

5. The computer-implemented method of claim 3, further comprising generating a speech model corresponding to the second utterance, wherein the second data includes the speech model.

6. The computer-implemented method of claim 3, wherein:
the first data includes audio preceding the audible command; and
the second data includes audio preceding the second utterance.

7. The computer-implemented method of claim 3, wherein:
the first data includes audio subsequent to the audible command; and
the second data includes audio subsequent to the second utterance.

8. The computer-implemented method of claim 3, wherein:
the first data includes a signal embedded in the first utterance;
the second data includes a reference signal; and
the comparing comprises comparing the signal embedded in the first utterance with the reference signal.

9. The computer-implemented method of claim 3, further comprising receiving a plurality of utterances from a plurality of devices at a substantially similar time; and
wherein the comparing comprises comparing the plurality or received utterances to each other to determine whether the plurality of received utterances are substantially similar.

10. The computer-implemented method of claim 3, wherein:
the second data includes a scheduled time when an instance of the second utterance is to be broadcast; and
the comparing comprises comparing the scheduled time with a time associated with the first utterance.

11. The computer-implemented method of claim 10, further comprising sending an instruction to cancel processing of the audible command to a plurality of devices.

12. A device, comprising:
at least one processor;
a memory device including instructions operable to be executed by the at least one processor to perform a set of actions, configuring the at least one processor to:
receive a first utterance from a device, the first utterance including an audible command;
determine first data corresponding to the first utterance;
obtain second data corresponding to a second utterance, wherein the second utterance is not received from the device;
compare the first data corresponding to the first utterance to the second data corresponding to the second utterance; and
cancel processing of the first utterance in response to the first data substantially matching the second data.

13. The device of claim 12, wherein the at least one processor is further configured to:
generate a reference audio fingerprint corresponding to the second utterance, wherein the second data includes the reference audio fingerprint; and
generate a first audio fingerprint corresponding to the first utterance, wherein the first data includes the first audio fingerprint.

14. The device of claim 13, wherein the at least one processor is further configured to generate a speech model corresponding to the second utterance, wherein the second data includes the speech model.

15. The device of claim 12, wherein:
the first data includes audio preceding the audible command; and
the second data includes audio preceding the second utterance.

16. The device of claim 12, wherein:
the first data includes audio subsequent to the audible command; and
the second data includes audio subsequent to the second utterance.

17. The device of claim 12, wherein:
the first data includes a signal embedded in the first utterance;
the second data includes a reference signal; and
the comparing comprises comparing the signal embedded in the first utterance with the reference signal.

18. The device of claim 12, wherein the at least one processor is further configured to:
receive a plurality of utterances from a plurality of devices at a substantially similar time; and wherein
the comparing comprises comparing the plurality or received utterances to each other to determine whether the plurality of received utterances are substantially similar.

19. The device of claim 12, wherein:
the second data includes a scheduled time when an instance of the second utterance is to be broadcast; and
the comparing comprises comparing the scheduled time with a time associated with the first utterance.

20. The device of claim 19, wherein the at least one processor is further configured to send an instruction to cancel processing of the audible command to a plurality of devices.

* * * * *